US012639958B2

(12) United States Patent
Jung et al.

(10) Patent No.: US 12,639,958 B2
(45) Date of Patent: May 26, 2026

(54) APPARATUS AND METHOD FOR GENERATING A LANE POLYLINE USING A NEURAL NETWORK MODEL

(71) Applicant: 42DOT INC., Seoul (KR)

(72) Inventors: Seok Woo Jung, Seoul (KR); Hee Yeon Kwon, Seoul (KR); Jung Hee Kim, Seoul (KR); Seong Gyun Jeong, Seongnam (KR)

(73) Assignee: 42DOT INC., Seoul (KR)

( * ) Notice: Subject to any disclaimer, the term of this patent is extended or adjusted under 35 U.S.C. 154(b) by 314 days.

(21) Appl. No.: 18/458,163

(22) Filed: Aug. 30, 2023

(65) Prior Publication Data

US 2024/0078817 A1     Mar. 7, 2024

(30) Foreign Application Priority Data

Aug. 31, 2022     (KR) ........................ 10-2022-0109847
Jan. 10, 2023     (KR) ........................ 10-2023-0003419

(51) Int. Cl.
| | |
|---|---|
| *G06V 20/56* | (2022.01) |
| *B60W 30/12* | (2020.01) |
| *G06V 10/82* | (2022.01) |

(52) U.S. Cl.
CPC ........... *G06V 20/588* (2022.01); *B60W 30/12* (2013.01); *G06V 10/82* (2022.01)

(58) Field of Classification Search
CPC .... G06V 20/588; G06V 10/82; G06V 10/454; B60W 30/12
See application file for complete search history.

(56) References Cited

U.S. PATENT DOCUMENTS

| | | | | |
|---|---|---|---|---|
| 11,001,231 | B1 * | 5/2021 | Hedman | ............ B60H 1/00778 |
| 2019/0096125 | A1 * | 3/2019 | Schulter | .............. G05D 1/0088 |
| 2019/0266418 | A1 * | 8/2019 | Xu | ........................ G06V 10/764 |
| 2019/0323852 | A1 * | 10/2019 | Ondruska | ............... G06F 17/18 |
| 2021/0342609 | A1 * | 11/2021 | Smolyanskiy | ........ G06V 10/764 |
| 2021/0358137 | A1 * | 11/2021 | Lee | .......................... G06T 7/246 |
| 2022/0067877 | A1 * | 3/2022 | Nikola | ................... G06V 20/56 |
| 2022/0092869 | A1 * | 3/2022 | Abbeloos | ............... G06V 10/82 |

(Continued)

OTHER PUBLICATIONS

Li ("PersFormer: 3D Lane Detection via Perspective Transformer and the OpenLane Benchmark") (Year: 2022).*

(Continued)

*Primary Examiner* — Solomon G Bezuayehu
(74) *Attorney, Agent, or Firm* — Harvest IP Law, LLP

(57) ABSTRACT

The present disclosure relates to a method and apparatus for generating a lane polyline by using a neural network model. The method according to an embodiment may extract a multi-scale image feature by using a base image obtained from at least one sensor loaded in a vehicle. According to the method, the multi-scale image feature is input to a first neural network model as input data and a BEV feature may be obtained as output data from the first neural network model. Also, according to the method, the BEV feature may be input to a second neural network model as input data and a polyline image with respect to a certain road may be obtained as output data from the second neural network model. In the present disclosure, a lane polyline obtained from the neural network may be utilized in vehicle control without going through an additional treatment process.

9 Claims, 16 Drawing Sheets

(56) References Cited

U.S. PATENT DOCUMENTS

| | | | |
|---|---|---|---|
| 2023/0057509 A1* | 2/2023 | Emmons | G06V 10/82 |
| 2023/0071437 A1* | 3/2023 | Kim | G06V 10/766 |
| 2023/0072731 A1* | 3/2023 | Li | G01S 7/4808 |
| 2024/0020953 A1* | 1/2024 | Park | G06V 20/56 |
| 2024/0070541 A1* | 2/2024 | Borse | G06N 20/00 |

OTHER PUBLICATIONS

Yicheng (VectorMapNet: End-to-end Vectorized HD Map Leaning) (Year: 2022).*
Dong-Hee Paek "K-Lane: Lidar Lane Dataset and Benchmark for Urban Roads and Highways" 2022.

* cited by examiner

FIG. 9
Ground truth
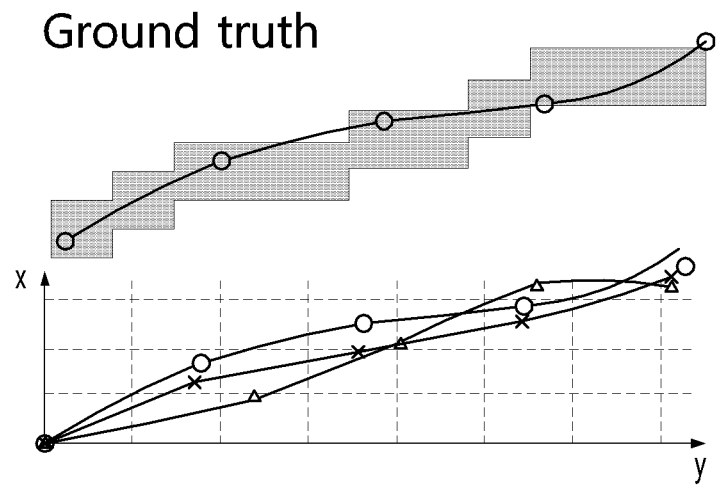
ORDER VALUE 1
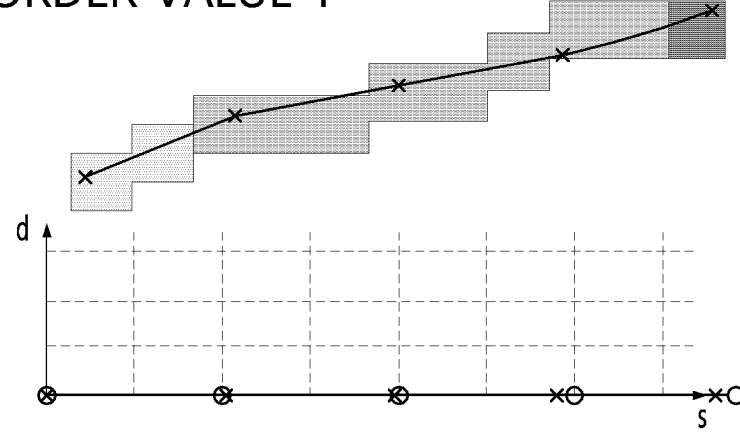
ORDER VALUE 2
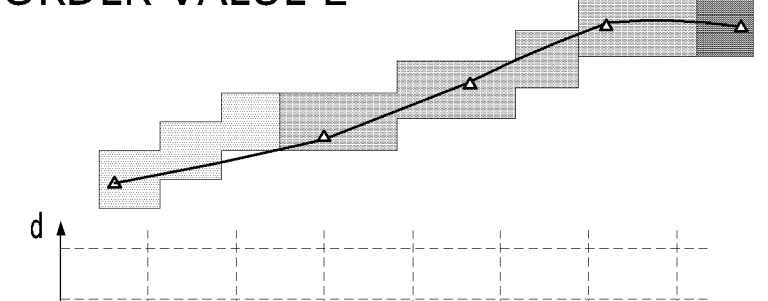

FIG. 10

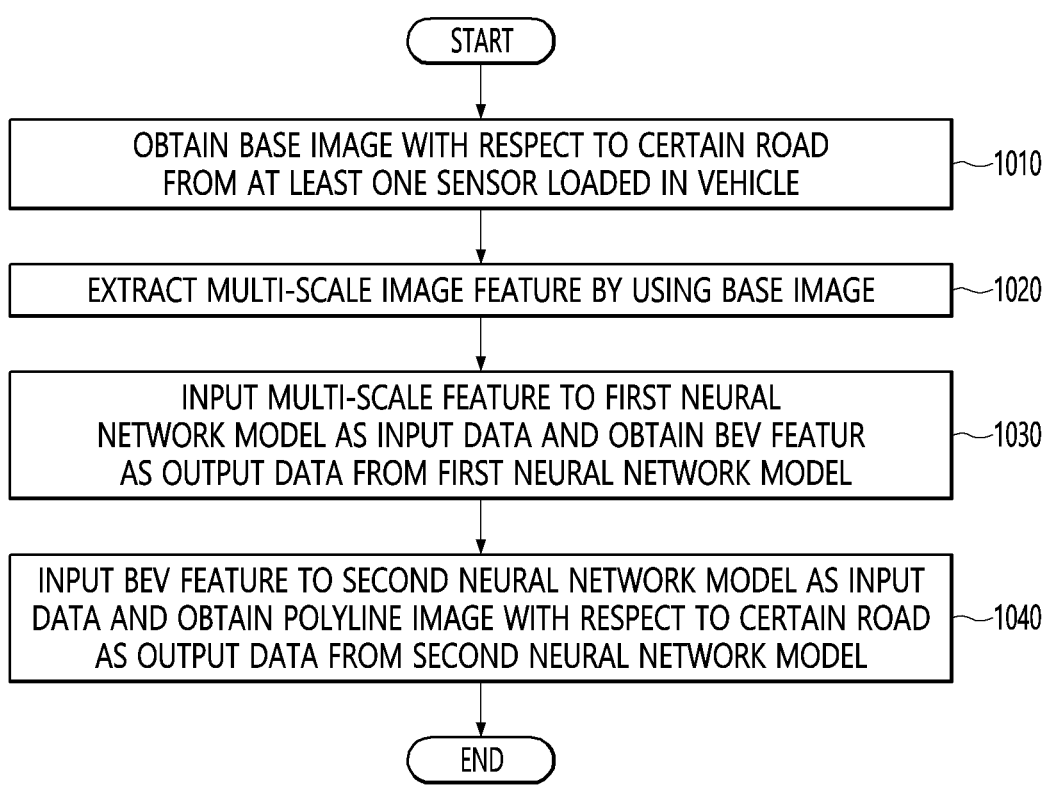

START

OBTAIN BASE IMAGE WITH RESPECT TO CERTAIN ROAD
FROM AT LEAST ONE SENSOR LOADED IN VEHICLE ~1010

EXTRACT MULTI-SCALE IMAGE FEATURE BY USING BASE IMAGE ~1020

INPUT MULTI-SCALE FEATURE TO FIRST NEURAL
NETWORK MODEL AS INPUT DATA AND OBTAIN BEV FEATUR
AS OUTPUT DATA FROM FIRST NEURAL NETWORK MODEL ~1030

INPUT BEV FEATURE TO SECOND NEURAL NETWORK MODEL AS INPUT
DATA AND OBTAIN POLYLINE IMAGE WITH RESPECT TO CERTAIN ROAD
AS OUTPUT DATA FROM SECOND NEURAL NETWORK MODEL ~1040

END

1

APPARATUS AND METHOD FOR GENERATING A LANE POLYLINE USING A NEURAL NETWORK MODEL

CROSS-REFERENCE TO RELATED APPLICATION

This application claims the benefit of Korean Patent Applications No. 10-2022-0109847, filed on Aug. 31, 2022 and No. 10-2023-0003419, filed on Jan. 10, 2023, in the Korean Intellectual Property Office, the disclosure of which is incorporated herein in its entirety by reference.

BACKGROUND

1. Field

The present disclosure relates to an apparatus and method of generating a lane polyline by using a neural network model.

2. Description of the Related Art

Due to the convergence of information and communication technology and vehicle industry, smartization of vehicles is rapidly progressing. Due to smartization, vehicles are evolving from simple mechanical devices to smart cars, and in particular, autonomous driving is highlighted as key technology of smart cars. Autonomous driving is a technique allowing a vehicle to reach the destination on its own even when a driver does not manipulate a steering wheel, acceleration pedal, brake, etc.

Recently, due to development in technology, safe driving assistance systems such as lane departure warning systems or lane keeping systems, automatic vehicle control systems, etc. have been developed and have been rapidly commercialized. In particular, detection of driving lanes is one of the core techniques for addressing major issues in autonomous driving vehicles, and a lot of researches are being actively conducted with international interests.

Because the detection of the driving lane largely affects safe driving, a driving lane is accurately detected by using various sensors in order to estimate and detect position of lanes. For example, various sensors such as an image sensor, a radio detecting and ranging (RADAR) sensor, or a light detecting and range (LIDAR) sensor are used alone or in combination with each other to implement an autonomous vehicle control system for lane detection or recognition of an object in front of a vehicle.

The above-mentioned background art is technical information that the inventor has possessed for the derivation of the present disclosure or acquired in the process of derivation of the present disclosure, and cannot necessarily be said to be a known technique disclosed to the general public prior to the filing of the present disclosure.

SUMMARY

Provided are apparatuses and methods of generating a lane polyline by using a neural network model. It will be appreciated by one of ordinary skill in the art that the objectives and effects that could be achieved with the present disclosure are not limited to what has been particularly described above and other objectives and advantages of the present disclosure will be more clearly understood from the following detailed description and embodiments of the present disclosure. Also, it will be readily understood that the objects and advantages of the present disclosure are realized by the means and combinations thereof set forth in the appended claims.

Additional aspects will be set forth in part in the description which follows and, in part, will be apparent from the description, or may be learned by practice of the presented embodiments.

According to a first aspect of the present disclosure, provided is a method of generating a polyline image by using a neural network model, including: obtaining a base image of a certain road from at least one sensor loaded in a vehicle; extracting a multi-scale image feature by using the base image; inputting the multi-scale image feature into a first neural network model as input data and obtaining a bird eye view (BEV) feature as output data from the first neural network model; and inputting the BEV feature into a second neural network model as input data and obtaining a polyline image of the certain road as output data from the second neural network model.

According to a second aspect of the present disclosure, provided is a neural network apparatus for generating a polyline image, the neural network apparatus including: a memory in which at least one program is stored; and a processor driving a neural network by executing the at least one program, wherein the processor is configured to obtain a base image of a certain road from at least one sensor loaded in a vehicle, extract a multi-scale image feature by using the base image, input the multi-scale image feature into a first neural network model as input data and obtain a bird eye view (BEV) feature as output data from the first neural network model, and input the BEV feature into a second neural network model as input data and obtain a polyline image of the certain road as output data from the second neural network model.

According to a third aspect of the present disclosure, provided is a non-transitory computer-readable recording medium having recorded thereon a program, which when executed by a computer, performs the method according to the first aspect.

Besides, any other method and system for implementing the present disclosure, and a computer-readable recording medium on which a computer program for executing the method is stored may be further provided.

Other aspects, features and advantages other than those described above will become apparent from the following detailed description of the drawings, claims and disclosure.

BRIEF DESCRIPTION OF THE DRAWINGS

These and/or other aspects will become apparent and more readily appreciated from the following description of the embodiments, taken in conjunction with the accompanying drawings in which:

FIG. 9 is an exemplary diagram for describing order loss according to an embodiment;

FIG. 10 is a flowchart for describing generation of a lane polyline by using a neural network model according to an embodiment.

DETAILED DESCRIPTION

Figure 1:
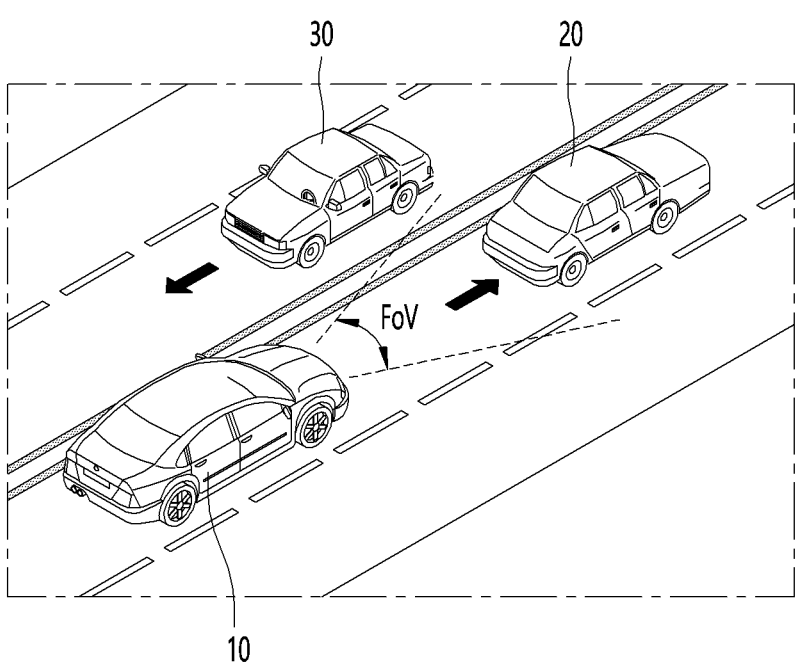
FIGS. 1 to 3 are diagrams for describing an autonomous driving method according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

The attached drawings illustrate one or more embodiments and are referred to in order to gain a sufficient understanding, the merits thereof, and the objectives accomplished by the implementation. However, this is not intended to limit the present disclosure to particular modes of practice, and it is to be appreciated that all changes, equivalents, and substitutes that do not depart from the spirit and technical scope are encompassed in the present disclosure. The embodiments suggested herein are for rendering the description of the present disclosure complete and are set forth to provide a complete understanding of the scope of the disclosure to one of ordinary skill in the art to which the present disclosure pertains. In the description, certain detailed explanations of the related art are omitted when it is deemed that they may unnecessarily obscure the essence of the present disclosure.

The terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the disclosure may be represented as functional block structures, various processing stages and/or various processing operations. Some or all of the functional blocks may be realized by any number of hardware and/or software components configured to perform the specified functions. For example, the functional blocks of the disclosure may be realized by one or more microprocessors or circuit structures for performing a predetermined function. In addition, for example, the functional blocks of the disclosure may be implemented with any programming or scripting language. The functional blocks may be implemented in algorithms that are executed on one or more processors. Also, the disclosure may employ any number of conventional techniques for electronics configuration, signal processing and/or, data processing and the like. The words "mechanism," "element," "means," and "configuration" are used broadly and are not limited to mechanical or physical embodiments.

In addition, the connecting lines, or connectors shown in the various figures presented are intended to represent exemplary functional relationships and/or physical or circuit couplings between the various elements. It should be noted that connections between elements by many alternative or additional functional relationships, physical connections or circuit connections may be present in a practical device.

Hereinafter, the term 'vehicle' may denote all types of transportation means such as a car, bus, motorcycle, kickboard, or truck that are used to move people or objects with engines.

The disclosure will be described in detail below with reference to accompanying drawings.

Figure 2:
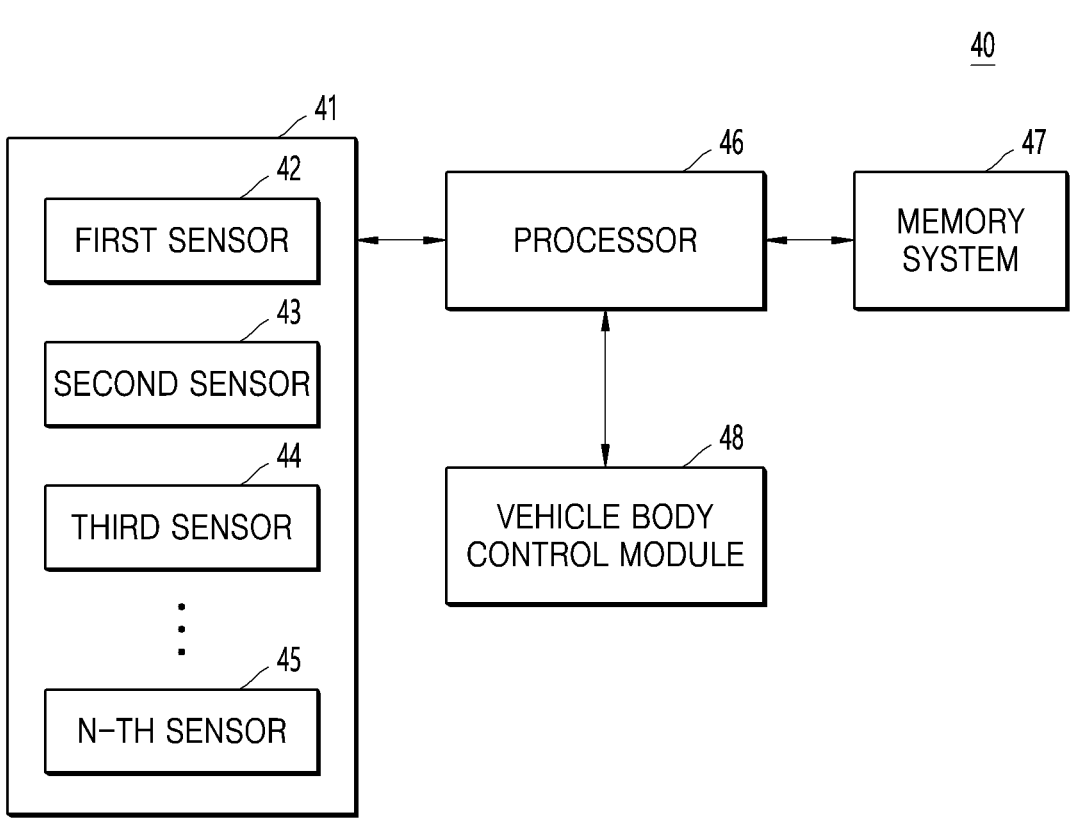
Figure 3:
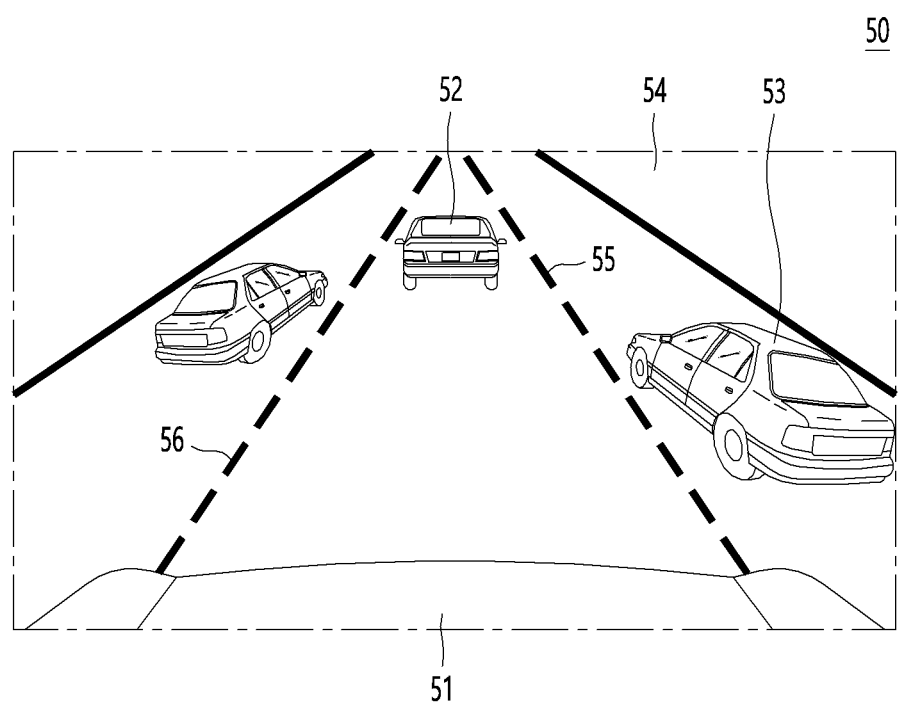

FIGS. 1 to 3 are diagrams for describing an autonomous driving method according to an embodiment of the present disclosure.

Referring to FIG. 1, an autonomous driving device according to an embodiment of the present disclosure may be attached to a vehicle to implement an autonomous driving vehicle 10. An autonomous driving device attached to the autonomous driving vehicle 10 may include various sensors for collecting peripheral context information. For example, the autonomous driving device may detect the movement of a preceding vehicle 20 driving in front, through an image sensor and/or an event sensor attached to a front surface of the autonomous driving vehicle 10. The autonomous driving device may further include sensors for detecting another driving vehicle 30 which is driving in a next lane, as well as in front of the autonomous driving vehicle 10, and pedestrians around the autonomous driving vehicle 10.

At least one of the sensors for collecting context information around the autonomous driving vehicle may have a certain field of view (FoV) as shown in FIG. 1. For example, when a sensor attached to the front of the autonomous driving vehicle 10 has an FoV as shown in FIG. 1, information detected from the center of the sensor may have a relatively large importance. This may be because most of the information corresponding to the movement of the preceding vehicle 20 is included in the information detected from the center of the sensor.

The autonomous driving device controls the movement of the autonomous driving vehicle 10 by processing information collected by the sensors of the autonomous driving vehicle 10 in real-time, and at the same time, at least some of the information collected by the sensors may be stored in a memory device.

Referring to FIG. 2, an autonomous driving device 40 may include a sensor unit 41, a processor 46, a memory system 47, and a vehicle body control module 48. The sensor unit 41 includes a plurality of sensors 42 to 45, and the plurality of sensors 42 to 45 may include an image sensor, an event sensor, an illuminance sensor, a global positioning system (GPS) device, an acceleration sensor, etc.

Data collected by sensors 42 to 45 may be transferred to the processor 46. The processor 46 stores the data collected by the sensors 42 to 45 in the memory system 47, and may determine the movement of the vehicle by controlling the vehicle body control module 48 based on the data collected by the sensors 42 to 45. The memory system 47 may include two or more memory devices and a system controller for controlling the memory devices. Each of the memory devices may be provided as a single semiconductor chip.

In addition to the system controller of the memory system 47, each of the memory devices included in the memory system 47 may include a memory controller, and the memory controller may include an artificial intelligence (AI) operation circuit such as a neural network. The memory controller may generate operation data by assigning a certain weight to the data received from the sensors 42 to 45 or the processor 46 and store the operation data in a memory chip.

Referring to FIG. 3, image data 50 may be data acquired by a sensor attached to the front of the autonomous driving vehicle. Therefore, the image data 50 includes a front portion 51 of the autonomous driving vehicle, a preceding vehicle 52 in the same lane as that of the autonomous driving vehicle, vehicles 53 driving around the autonomous driving vehicle, a background 54, and lanes 55 and 56, etc.

In the image data 50 according to the embodiment shown in FIG. 3, data of a region where the front portion 51 of the autonomous driving vehicle and the background 54 appear is data that is unlikely to affect the operation of the autonomous driving vehicle. In other words, the front portion 51 of the autonomous driving vehicle and the background 54 may be regarded as data having relatively low importance.

On the other hand, a distance to the preceding vehicle 52 and the movement of the driving vehicle 53 to change lanes may be very important factors in safe driving of the autonomous driving vehicle. Therefore, data of a region including the preceding vehicle 52 and the driving vehicle 53, etc. in the image data 50 may have a relatively high importance in the operation of the autonomous driving vehicle.

The memory device of the autonomous driving device may store the image data 50 received from the sensor by assigning different weight to each region. For example, a high weight is given to data of a region including the preceding vehicle 52, the driving vehicle 53, etc., and a low weight is given to data of a region where the front portion 51 of the autonomous driving vehicle and the background 54 appear.

In addition, the autonomous driving device may detect the lanes 55 and 56 included in the road on which the vehicle is currently driving. For example, the autonomous driving device detects lane pixels that are highly likely to correspond to lanes in the image data 50 through image processing, and fits the detected lane pixels into a specific lane model to determine the lane arrangement situation ahead.

In an embodiment, the autonomous driving device may detect lane pixels from the image data 50 by using a neural network model. The neural network model is a model trained to detect lane pixels corresponding to lanes from the image data 50. The image data 50 is input to the neural network model, and the neural network model may output probability information indicating a probability that each image pixel included in the image data 50 corresponds to the lanes 55 and 56. The autonomous driving device may determine the lane pixels based on probability information for each pixel. For example, the autonomous driving device may determine image pixels, from among the image pixels in the image data 50, having a probability value determined by the neural network model greater than a threshold value as lane pixels.

Figure 4:
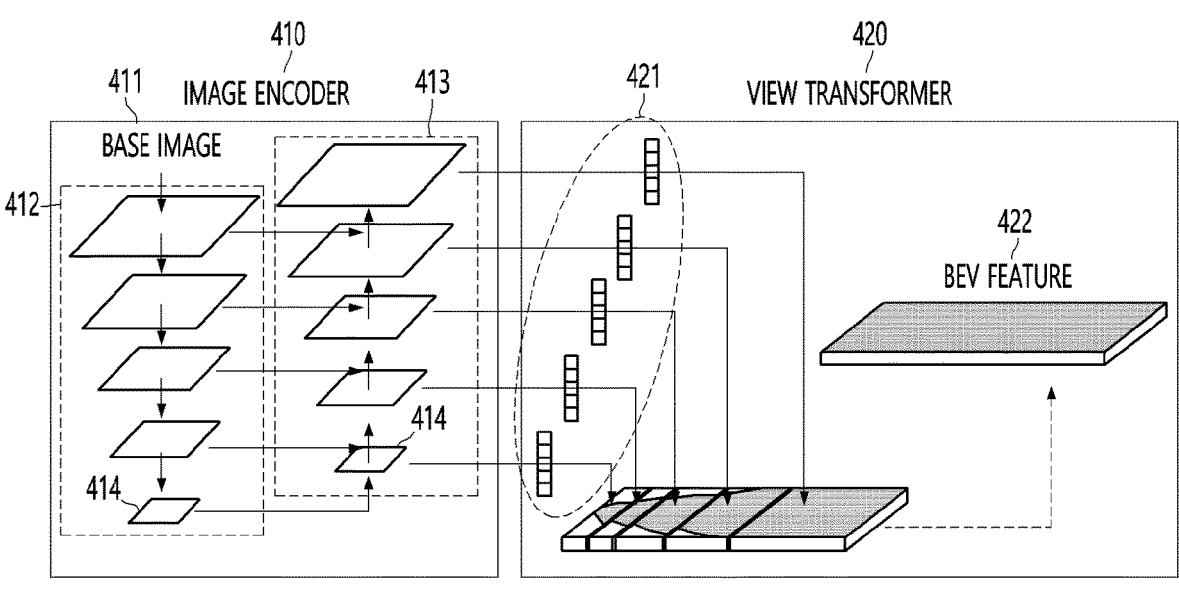
FIG. 4 is an exemplary diagram for describing a method of performing an image encoding and a view transformation according to an embodiment.

FIG. 4 is an exemplary diagram for describing a method of performing an image encoding and a view transformation according to an embodiment.

Referring to FIG. 4, the apparatus for generating the lane polyline may include an image encoder 410 and a view transformer 420.

The image encoder 410 may use a base image 411 as input data. The base image 411 may be an image of a road on which the vehicle is driving, obtained from at least one sensor loaded in the vehicle. For example, at least one sensor loaded in the vehicle may be implemented as the sensor unit 41 described above with reference to FIG. 2.

The image encoder 410 may extract a multi-scale image feature 421 by applying the base image 411 to a feature pyramid network.

The feature pyramid network may include a bottom-up process 412 and a top-down process 413. The bottom-up process 412 may be a forwarding process of generating a plurality of first feature maps by lowering the resolution of the base image 411 by ½ using a convolution neural network (CNN). For example, in the bottom-up process 412, Res-Net50 may be used and first feature maps having sizes of ⅛, 1/16, 1/32, and 1/64 of the base image 411 may be generated.

In the top-down process 413, a plurality of second feature maps are generated by up-sampling a final first feature map 414 generated in the bottom-up process 412 by a factor of two, and the multi-scale image feature 421 may be extracted by combining the plurality of second feature maps with the plurality of first feature maps.

The view transformer 420 may generate a bird eye view (BEV) feature 422 by performing view transformation on the multi-scale image feature 421 extracted by the image encoder 410. A method of generating the BEV feature 422 is described later with reference to FIG. 5.

Figure 5A:
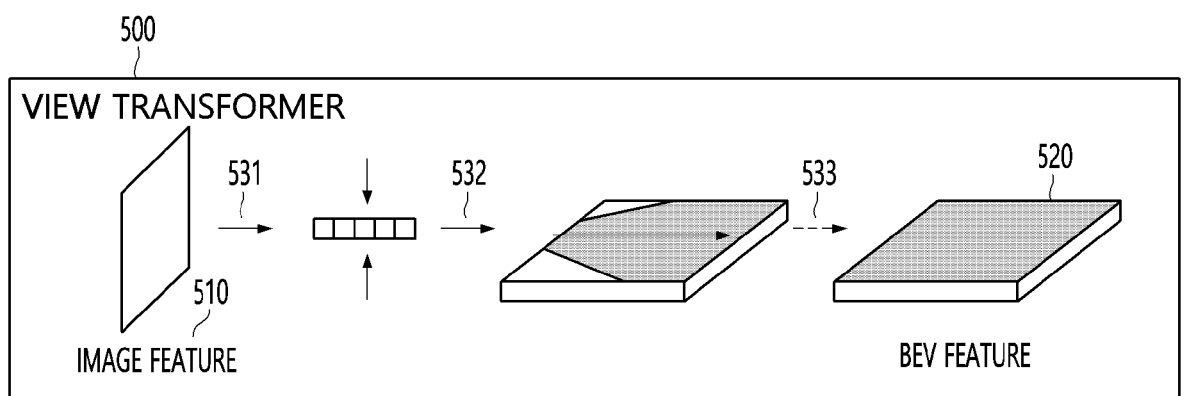
FIG. 5A is an exemplary diagram for describing a method of generating a bird's eye view (BEV) feature according to an embodiment.

FIG. 5A is an exemplary diagram for describing a method of generating the BEV feature according to an embodiment.

Referring to FIG. 5A, a view transformer 500 included in an apparatus for generating a lane polyline is shown. The view transformer 500 may receive an input of an image feature 510 and generate a BEV feature 520 through certain processes.

Specifically, the view transformer 500 collapses in the height dimension of the image feature 510 in first operation 531, stretches a multi-scale image feature including the image feature 510 in a depth dimension in second operation 532, and performs resampling by using a camera parameter in third operation 533 so as to generate the BEV feature 520.

In addition, the apparatus for generating the lane polyline may remap the BEV feature 520 to a canonical coordinate by applying homography transformation Hc to the BEV feature 520 fBEVc. In detail, the apparatus for generating lane polyline may apply the homography transformation to the BEV feature 520 fBEVc according to Equation 1 below. In Equation 1 below, I denotes the base image, F(•) denotes an image encoder function, τ(•) denotes a view transformer, K is a camera-related parameter (e.g., focal length, camera focal point, etc.), wherein the camera photographs a certain road, R denotes a rotation transformation between a vehicle coordinate system and a camera coordinate system, and t denotes a movement transformation between the vehicle coordinate system and the camera coordinate system. In addition, $z=0$ denotes that the transformed BEV feature $f_{BEV}$, which is a result value according to Equation 1, is a value on an XY plane.

[Equation 1]

$$f_{BEV} = H_C(f_{BEV_C}, R, t, z = 0), \text{ where } f_{BEV_C} = \tau(F(I), K)$$

The apparatus for generating lane polyline may use the converted BEV feature $f_{BEV}$ as input data to the neural network model and use a lane polyline with respect to a certain road as output data to train the neural network model. A method of training the neural network model is described below with reference to FIGS. 6A and 6B.

Figure 5B:
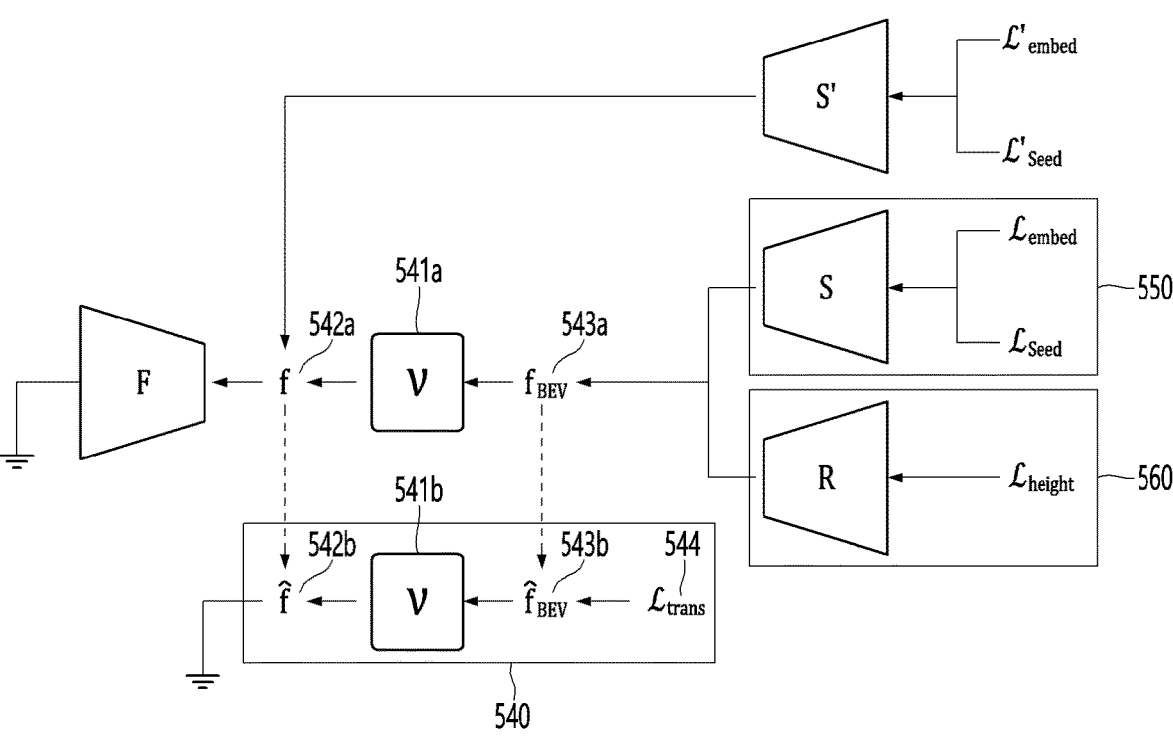
FIG. 5B is an exemplary diagram for describing processes of training a first neural network model 540 according to an embodiment.

FIG. 5B is an exemplary diagram for describing processes of training a first neural network model 540 according to an embodiment.

A first view transformer 541*a* of FIG. 5B may correspond to the view transformer 500 of FIG. 5A. The first view transformer 541*a* may receive an input of an image feature f 542*a* and may generate a BEV feature $f_{BEV}$ 543*a* according to the method described above with reference to FIG. 5A.

In addition, imperfect geometry transformation and information loss may occur during the view transformation process. To address the above issue, in the present disclosure, the first neural network model 540 may be used in order to cover the imperfect geometry transformation and minimize the information loss.

The first neural network model 540 may be trained by using translation loss $L_{trans}$ that maintains consistency regardless of view change. That is, in a situation where three-dimensional (3D) lane annotation and camera pose parameters are known, in the present disclosure, the image feature and the BEV feature associated with the lane may be learned together using the first neural network model 540.

In detail, the first neural network model 540 may be trained by using the translation loss $L_{trans}$ 544 that is calculated through bi-directional comparison between pixel coordinates of the plurality of image features $\hat{f}$ 542*b* and grids in the BEV feature $\hat{f}_{BEV}$ 543*b*. The translation loss $L_{trans}$ 544 may be expressed by Equation 2 below.

[Equation 2]

$$L_{trans} = \frac{1}{N}\sum_i^N \left\| h(f_i) - \hat{f}_{iB}\right\|^2 + \left\|\hat{f}_i - h^{-1}(f_{iB})\right\|^2$$

Referring to Equation 2 above, the translation loss $L_{trans}$ 544 may be determined based on a first value indicating a difference between a value $h(f_i)$ obtained by applying a lookup table function h( ) to a pixel coordinate $f_i$ and a grid value $\hat{f}_{iB}$, and a second value indicating a difference between a pixel coordinate value $\hat{f}_i$ and a value h−1 ($f_{iB}$) obtained by applying a lookup table inverse function h−1( ) to the grid value $f_{iB}$.

Also, during a process of optimizing parameters of the second view transformer 541*b* of the first neural network model 540 so as to minimize the translation loss $L_{trans}$ 544, in order for the backpropagation of a gradient calculated by the translation loss $L_{trans}$ 544 not to affect a second neural network model 550 and a third neural network model 560, in the present disclosure, the first neural network model 540 may be detached from the second neural network model 550 and the third neural network model 560 to configure the system. That is, in FIG. 5B, in order to represent the characteristic of separating between models, the image feature f 542*a* and the BEV feature $f_{BEV}$ 543*a*, and the image feature $\hat{f}$ 542*b* and the BEV feature $f_{BEV}$ 543*b* are shown to be different from each other, but the values of corresponding features may be the same as each other.

In addition, the second neural network model 550 and the third neural network model 560 are described later with reference to FIGS. 6A and 6B.

Figure 6A:
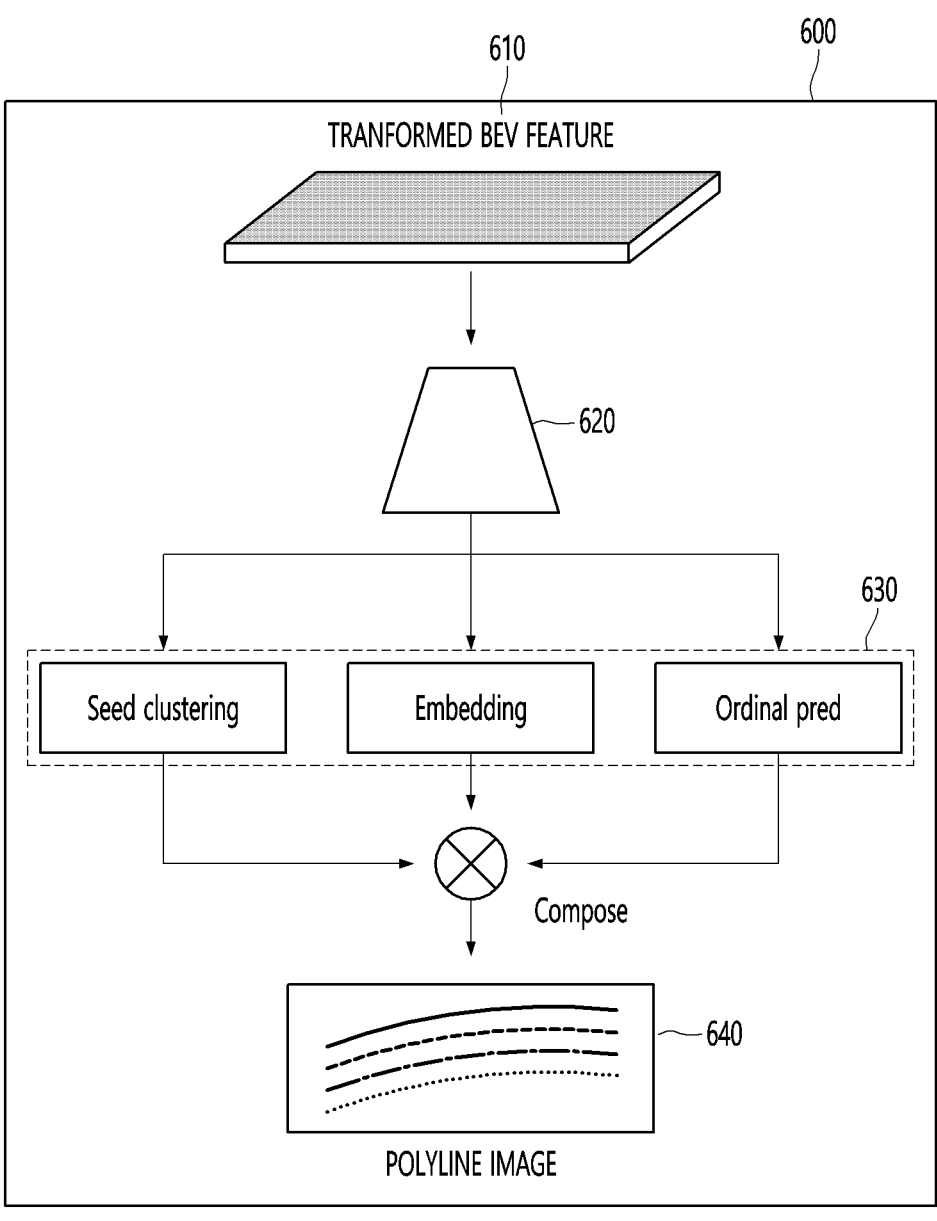
FIG. 6A is an exemplary diagram for describing a method of operating a neural network according to an embodiment.

FIG. 6A is an exemplary diagram for describing a method of operating a second neural network 600 according to an embodiment.

Referring to FIG. 6A, the second neural network model 600 is shown. The apparatus for generating lane polyline inputs a transformed BEV feature 610 as an input to the second neural network 600 and may obtain a lane polyline 640 (or polyline image) of a certain road as output data from the second neural network model 600.

The transformed BEV feature 610 may be input to the second neural network model 600 as input data. The transformed BEV feature 610 may be a result value calculated by using Equation 1 above. The lane polyline 640 may be obtained as output data from the second neural network model 600 by applying at least one layer 620 and a loss function 630 set in advance to the transformed BEV feature 610.

In an embodiment, the second neural network model 600 may be trained so that a value of a loss function L(•) according to Equation 3 below may have a minimum value. In Equation 3, I denotes a base image, M(•) denotes the second neural network model 600, K denotes a camera-related parameter (e.g., focal length, camera focal point, etc.), wherein the camera photographs a certain road, R denotes a camera coordinate system, and t denotes a vehicle coordinate system. $X_{BEV}$ is a ground truth value of a lane polyline with respect to a certain road, and $X_{BEV}$ denotes a value of the lane polyline with respect to a certain road, predicted through the second neural network model 600.

[Equation 3]

$$\text{minimize } L(X_{BEV}, \hat{X}_{BEV}), \text{ where } \hat{X}_{BEV} = M(I; K, R, t)$$

In the present disclosure, a lane polyline with respect to a certain road may be obtained through an end-to-end learning of the second neural network model 600 without using a homography function. To this end, at least one loss function used in the training of the second neural network model 600 may be set in the present disclosure. Detailed descriptions about the loss function are provided below.

Figure 6B:
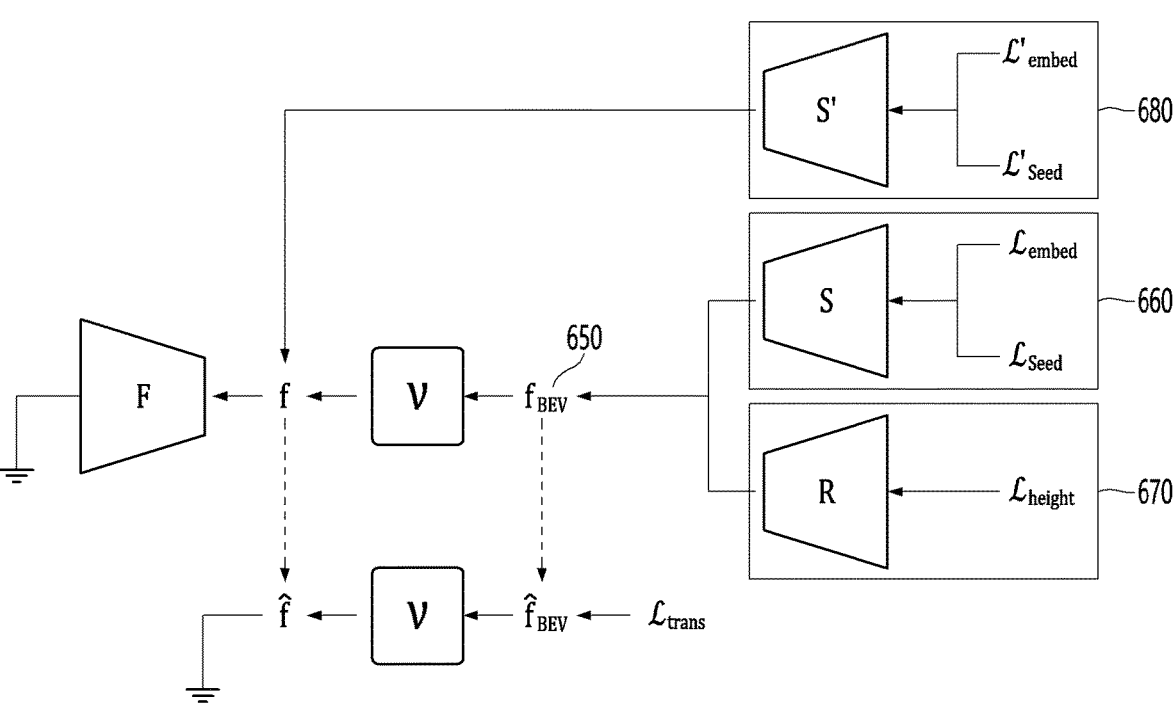
FIG. 6B is an exemplary diagram for describing processes of training a second neural network model 620 and a third neural network model 630 according to an embodiment.

FIG. 6B is an exemplary diagram for describing processes of training a second neural network model 660 and a third neural network model 670 according to an embodiment.

Referring to FIG. 6B, the apparatus for generating lane polyline may input a BEV feature $f_B$ 650 to the second neural network model 660 and may obtain a polyline image with respect to a certain road as output data from the second neural network model 660.

Here, the second neural network model 660 may be trained by using an embedding offset loss $L_{embed}$. The embedding offset loss $L_{embed}$ may be determined based on a probability that, with respect to a plurality of clusters corresponding respectively to a plurality of lanes included in a certain road, each of background pixels corresponds to a certain cluster from among the plurality of clusters. The embedding offset loss $L_{embed}$ is described in more detail below with reference to Equation 6.

Also, the second neural network model 660 may be trained by using a seed probability loss $L_{seed}$. The seed probability loss $L_{seed}$ may be determined by applying, from among the plurality of pixels included in the BEV feature $f_B$ 650, a first equation to the pixels included in the foreground and applying a second equation to pixels included in the background. The seed probability loss $L_{seed}$ is described in more detail below with reference to Equation 5.

Also, the second neural network model 660 may be trained by using an order loss $L_{ord}$. The order loss $L_{ord}$ may be determined by using the order of foreground pixels, from among the plurality of pixels included in the BEV feature $f_B$ 650, with respect to the lanes corresponding to the clusters respectively including the foreground pixels. The order loss $L_{ord}$ is described in more detail below with reference to Equation 9.

The second neural network model 660 may be trained so that at least one from the embedding offset loss $L_{embed}$, the seed probability loss $L_{seed}$, and the order loss $L_{ord}$ is minimized.

In an embodiment, the apparatus for generating lane polyline may input the BEV feature into the third neural network model 670 as input data and may obtain a height value for each grid in the BEV feature as output data from the third neural network model 670.

Here, the third neural network model 670 may be trained by using a height loss $L_{height}$. The height loss $L_{height}$ may be determined based on a height value $z_i$ of a pseudo ground truth map that is obtained by interpolating a z-value in the grids of the BEV feature $f_B$ 650 by using a lane marker.

The height loss $L_{height}$ may be expressed by Equation 4 below.

$$L_{height} = \frac{1}{N} \sum_{i}^{N} \|Z_i - \hat{z}_i\|^2 \qquad \text{[Equation 4]}$$

Referring to Equation 4 above, the height loss $L_{height}$ may be calculated as a mean square error between the height value $Z_i$ of the pseudo ground truth map and the height value $\hat{z}_i$ of the grid in the BEV feature $f_B$ 650.

In addition, a Gaussian filter layer having a fixed kernel weight value may be applied between convolution layers in the third neural network model 670. The Gaussian filter layer may prevent sudden change in the height of a neighboring grid.

In the present disclosure, spatial embedding of x-displacement and y-displacement with respect to a centroid of a lane is predicted by using the second neural network model 660, and a probability of corresponding to the lane is predicted to generate the polyline. Also, in the present disclosure, a height of a road surface from the ground may be predicted densely by using the third neural network model 670.

In an embodiment, the apparatus for generating lane polyline may further include an additional neural network model 680. The additional neural network model 680 may be used to further focus on features related to a lane region in the image feature.

Figure 7A:
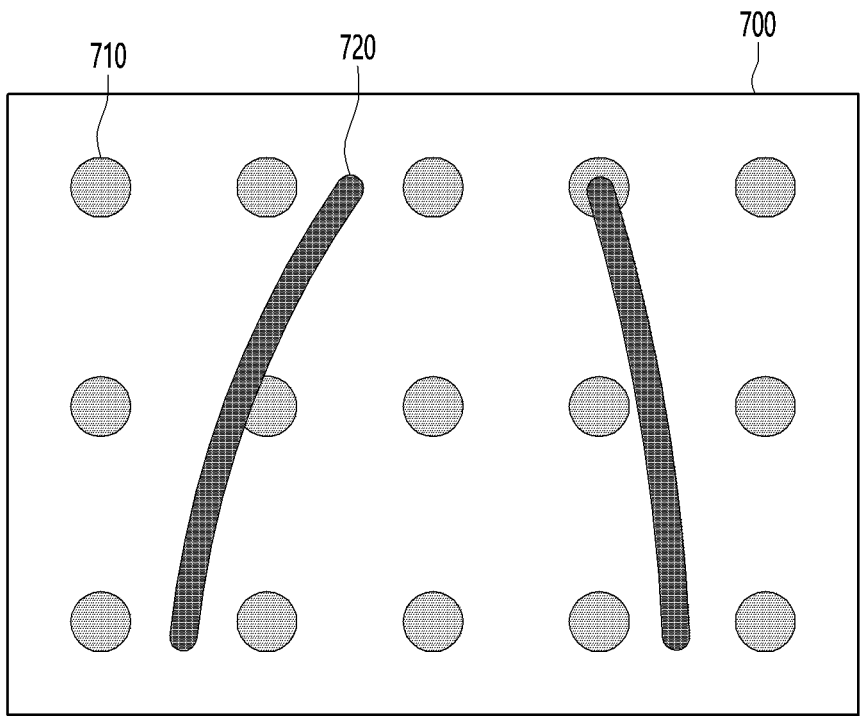
FIGS. 7A and 7B are exemplary diagrams for describing a seed probability loss according to an embodiment.
Figure 7B:
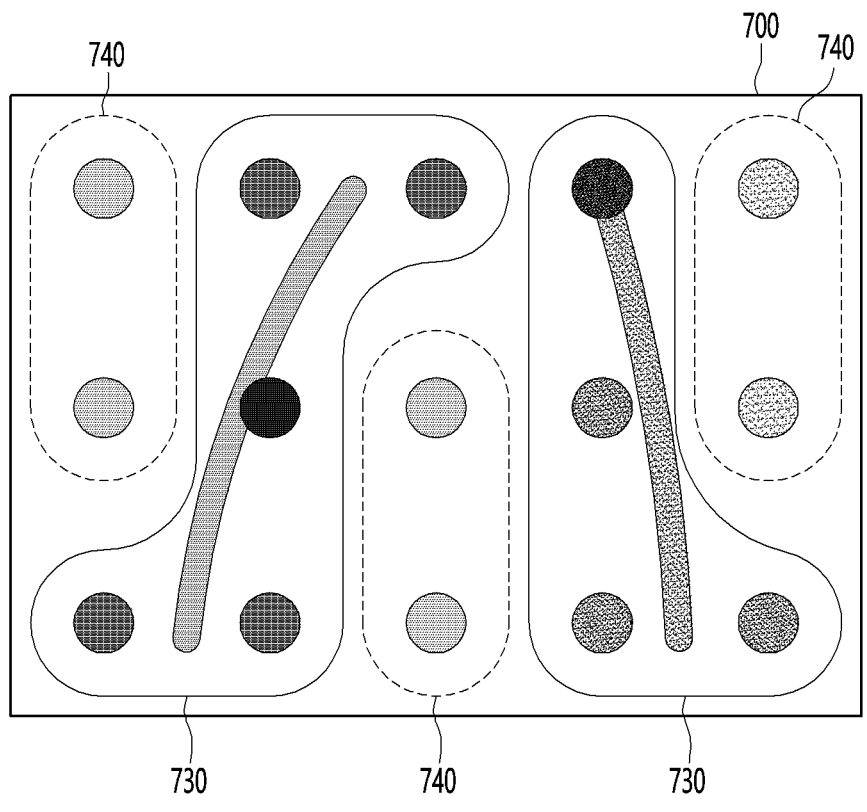

FIGS. 7A and 7B are exemplary diagrams for describing a seed probability loss according to an embodiment.

Referring to FIGS. 7A and 7B, a pixel coordinate system 700 is shown. The apparatus for generating lane polyline may generate the pixel coordinate system 700 by transforming a spatial coordinate system of the BEV feature into an embedding coordinate system.

Referring to FIG. 7A, a dot mark 710 included in the pixel coordinate system 700 indicates a pixel and a straight-line mark 720 indicates a lane.

A BEV image generating device may set a seed probability loss as at least one loss function (or loss) applied to the second neural network model. The seed probability may have a value that varies depending on whether each of the plurality of pixels on the pixel coordinate system 700 corresponds to a category between foreground or background. Here, the foreground denotes an object such as a vehicle, a lane, etc., and the background denotes a background image. When a certain pixel on the pixel coordinate system 700 is determined as the background, the apparatus for generating lane polyline may determine a seed probability of the corresponding pixel as 0. Also, when the probability that a certain pixel on the pixel coordinate system 700 corresponds to the foreground increases, the apparatus for generating lane polyline may determine that the seed probability of the corresponding pixel may have a value close to 1.

The plurality of pixels on the pixel coordinate system 700 are classified as foreground pixels representing the foreground and background pixels representing the background, and referring to FIG. 7B, the plurality of pixels in a first pixel group 730 on the pixel coordinate system 700 correspond to the foreground pixels and pixels in a second pixel group 740 correspond to the background pixels.

In an embodiment, the apparatus for generating lane polyline applies a first equation to the foreground pixels corresponding to the foreground, from among the plurality of pixels, and applies a second equation to the background pixels corresponding to the background, so as to set the seed probability loss consisting of the first equation and the second equation.

The BEV image generating device may calculate a probability that, with respect to a plurality of clusters corresponding respectively to a plurality of lanes included in a certain road, each of the background pixels corresponds to a certain cluster from among the plurality of clusters. The apparatus for generating lane polyline may set the first equation based on the pixel value of the foreground pixel and the calculated probability. In addition, a method of calculating a probability of corresponding to the cluster is described below with reference to FIGS. 8A to 8C.

Also, the apparatus for generating lane polyline may set the first equation by further applying a scaling factor, in order to correct an imbalance between the pixel value of the foreground pixel and the pixel value of the background pixel.

Also, the apparatus for generating lane polyline may set the second equation based on the pixel value of the background pixel.

The seed probability loss including the first equation and the second equation may be expressed by Equation 5 below. In an embodiment, the second neural network model may be trained so that a value of the seed probability loss $L_{seed}(\bullet)$ according to Equation 5 below may have a minimum value.

In Equation 5 below, a first term on right side may be the above-mentioned first equation, and a second term may be the above-mentioned second equation. In addition, in Equation 5 below, N denotes the number of pixels included in the pixel coordinate system 700, $\delta$ denotes the scaling factor, $q_i$ denotes a seed prediction value of an i-th pixel, $S_k$ denotes foreground, $b_g$ denotes background, and $\emptyset_k(e_i)$ denotes a probability that an i-th embedding coordinate $e_i$ on the pixel coordinate system 700 corresponds to a k-th cluster.

$$L_{seed} = \frac{1}{N}\sum_{i}^{N} \delta * 1_{\{q_i \in S_k\}}\|q_i - \phi_k(e_i)\|^2 + 1_{\{q_i \in bg\}}\|q_i - 0\|^2 \qquad \text{[Equation 5]}$$

Figure 8A:
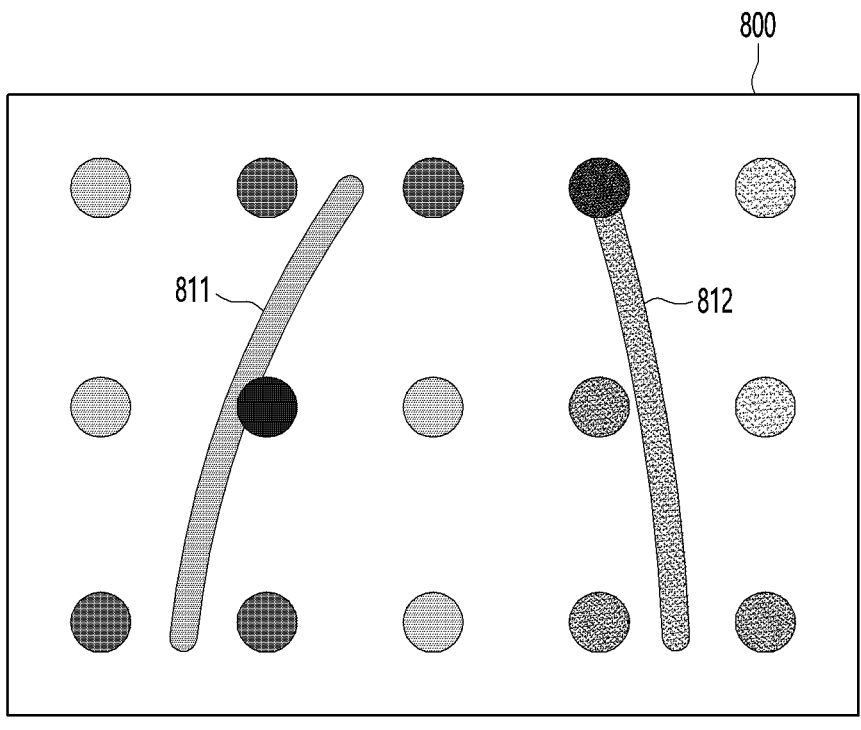
FIGS. 8A to 8C are exemplary diagrams for describing embedding offset loss.
Figure 8B:
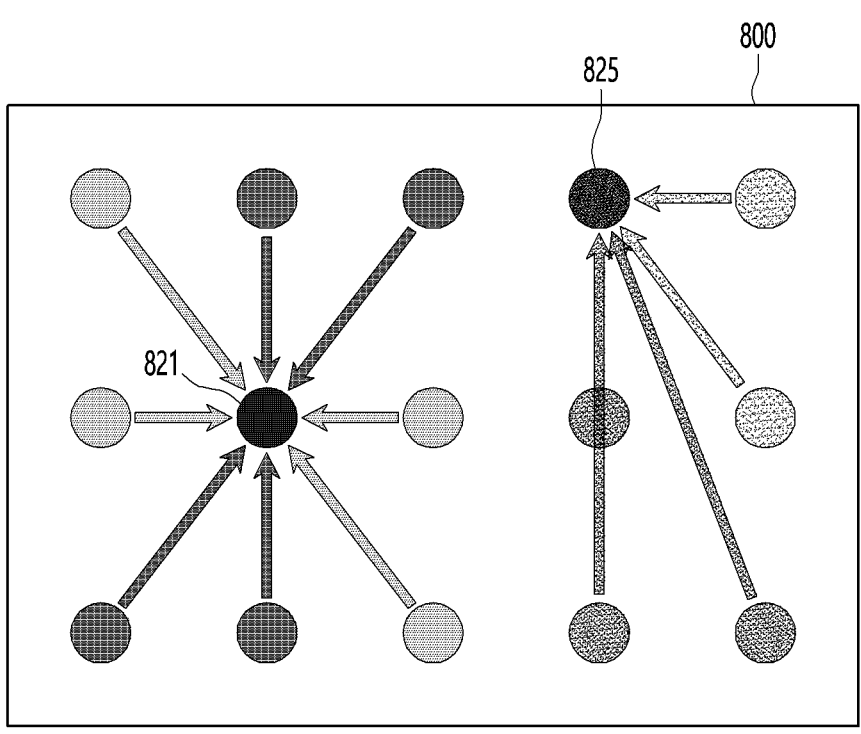
Figure 8C:
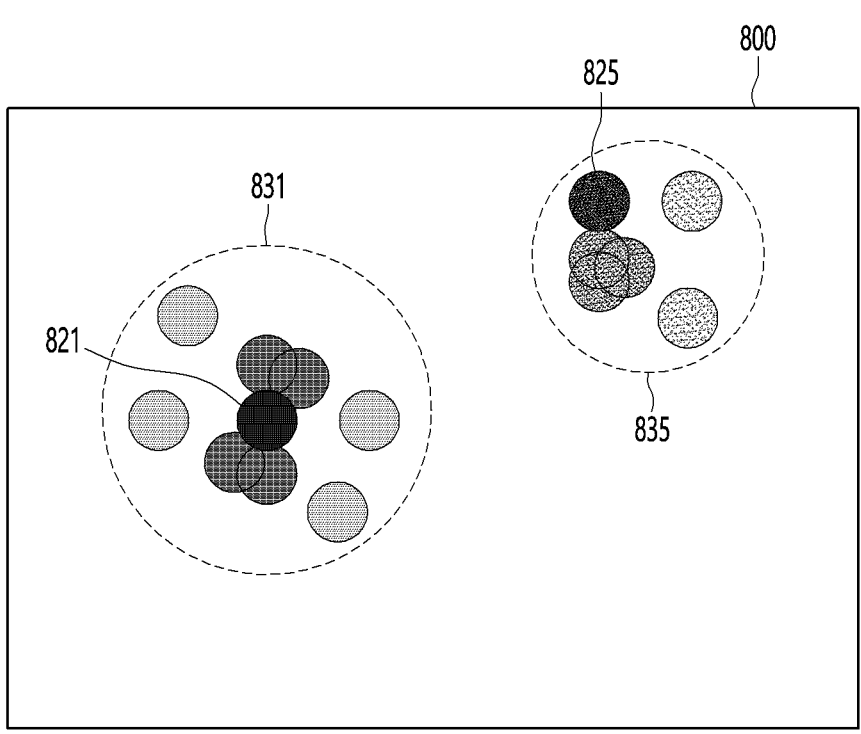

FIGS. 8A to 8C are exemplary diagrams for describing an embedding offset loss.

Referring to FIGS. 8A to 8C, a pixel coordinate system 800 is shown. Referring to FIG. 8A, a first straight line mark 811 and a second straight line mark 812 included in the pixel coordinate system 800 denote different lanes.

The apparatus for generating lane polyline may set an embedding offset loss as at least one loss function (or loss) applied to the second neural network model. The embedding offset indicates a probability that the i-th embedding coordinate $e_i$ on the pixel coordinate system 800 corresponds to the k-th cluster. Here, a cluster may be set for each of a plurality of lanes included in a certain road. As the i-th pixel on the pixel coordinate system 800 is located closer to a center of the k-th cluster, the apparatus for generating lane polyline may determine the corresponding probability value $\emptyset_k(e_i)$ close to 1.

Referring to FIG. 8B, a shade in each pixel is displayed by visualizing the probability of corresponding to a certain cluster, and as the shade becomes darker, the value of the probability of corresponding to a certain cluster is greater. A first pixel 821 located close to the first straight line mark 811 in FIG. 8A. and a second pixel 825 located close to the second straight line mark 812 in FIG. 8A. have a very large probability value of corresponding to a certain cluster, and thus, in FIG. 8B, the shades in the pixels are dark. In addition, the apparatus for generating lane polyline may only calculate the probability of corresponding to a certain cluster with respect to the foreground pixels, and may omit the calculation with respect to the background pixels.

Referring to FIG. 8C, it is shown that pixels are aggregated in each cluster. The above BEV feature has spatial coordinates, and the apparatus for generating lane polyline may drive the second neural network model and transform the BEV feature having the spatial coordinates into two-dimensional embedding coordinates 850.

The apparatus for generating lane polyline may set the first pixel 821 as a centroid of a first cluster 831 and the second pixel 825 as a centroid of a second cluster 835, on the embedding coordinate 850.

In an embodiment, the apparatus for generating lane polyline may extract foreground pixels corresponding to the foreground from among the plurality of pixels included in the BEV feature. Also, the apparatus for generating lane polyline may calculate the probability that each of the foreground pixels corresponds to a certain cluster from among a plurality of clusters, with respect to the plurality of clusters on the embedding coordinate 850, the plurality of clusters corresponding respectively to the plurality of lanes included in a certain road. Also, the apparatus for generating lane polyline may set an embedding offset loss using the calculated probability and may train the second neural network model by using the embedding offset loss.

Also, the apparatus for generating lane polyline may set a centroid with respect to each of the plurality of clusters on the embedding coordinate 860 and a fixed margin for forming the clusters. The apparatus for generating lane polyline may calculate a probability that each of the foreground pixels corresponds to a certain cluster from among the plurality of clusters, by using the centroid and the fixed margin.

Also, the apparatus for generating lane polyline may set a clustering threshold probability value in order to calculate a probability that each of the foreground pixels corresponds to a certain cluster from among the plurality of clusters on the embedding coordinate 850. The apparatus for generating lane polyline may calculate a probability that each of the foreground pixels corresponds to a certain cluster from among the plurality of clusters, by using the centroid, the fixed margin, and the clustering threshold probability value.

The second neural network model may be trained so that a value of an embedding offset loss $L_{embed}(\bullet)$ according to Equation 6 below may have a minimum value. In Equation 6 below, K denotes the number of clusters, $L_h(\bullet)$ denotes support vector machine-related loss (e.g., Lovasz hinge loss).

$$L_{embed} = \frac{1}{K}\sum_{k=1}^{K} L_h(\{p\}, \{\phi_k(e_i)\})\, s.t.\ p\begin{cases} 1, & \text{if } e_i \in S_k \\ 0, & \text{otherwise} \end{cases} \forall\, e_i \in fg \qquad \text{[Equation 6]}$$

Also, $\emptyset_k(e_i)$ that is the probability that each of the foreground pixels corresponds to a certain cluster from among the plurality of clusters on the embedding coordinate 850 may be calculated according to Equation 7 below. According to Equation 7 below, $\emptyset_k(e_i)$ follows a Gaussian distribution.

$$\phi_k(e_i) = \exp\left(-\frac{\left\|e_i - \frac{1}{|S_k|}\Sigma_{ej \in S_k} e_j\right\|^2}{2\sigma^2}\right) \qquad \text{[Equation 7]}$$

In addition, $\sigma$ of Equation 7 above may be calculated according to Equation 8 below. In Equation 8 below, R denotes a fixed margin for forming the clusters in an embedding space 800, and $P_r$ denotes a clustering threshold probability value.

$$\sigma = R\sqrt{-0.5\ \log P_r} \qquad \text{[Equation 8]}$$

FIG. 9 is an exemplary diagram for describing order loss according to an embodiment.

The apparatus for generating lane polyline may set an order loss as at least one loss function (or loss) applied to the second neural network model. Here, the order denotes an order of start and end of a lane corresponding to the polyline. As a certain pixel on the pixel coordinate system is close to a starting point of a lane, the apparatus for generating lane polyline may determine the order value close to 0, and as the certain pixel is close to an ending point of a lane, the apparatus for generating lane polyline may determine the order value close to 1.

Referring to FIG. 9, it is shown in which order respective pixels on the pixel coordinate system are arranged between the starting point and the ending point of the lane. Order value 1 and order value 2 in FIG. 9 indicate result values for different lanes (or clusters). In FIG. 9, as the shade is displayed darker, it is indicated that a certain pixel is close to the ending point of the lane.

In an embodiment, the apparatus for generating lane polyline may extract foreground pixels corresponding to the foreground from among the plurality of pixels included in the BEV feature. Also, the apparatus for generating lane polyline may set an order loss using the order of each of the foreground pixels with respect to the lanes included in a certain road and may train the second neural network model by using the order loss.

Also, in order to set the order loss, the apparatus for generating lane polyline may identify a cluster in which each of the foreground pixels is included and may determine order values of the foreground pixels with respect to the lane corresponding to the identified cluster. The apparatus for generating lane polyline may set the order loss by using the order value with respect to each of the foreground pixels.

Also, in order to determine the order value, the apparatus for generating lane polyline may determine the order values of the foreground pixels so that the foreground pixel closer to the starting point of the lane may have a value close to a first value and the foreground pixel closer to the ending point of the lane may have a value close to a second value.

The apparatus for generating lane polyline may set the order loss by using a smooth L1 algorithm, but the algorithm used herein may not be limited thereto.

The second neural network model may be trained so that a value of an order loss $L_{ord}(\cdot)$ according to Equation 9 below may have a minimum value. In Equation 9, $d_n$ denotes an order value of an n-th pixel and may have a value between 0 and 1. $\hat{d}_n$ denotes a ground truth value.

$$L_{ord} = \frac{1}{|fg|} \sum_{d_n, \hat{d}_n \in fg} \text{Smooth } L1(d_n, \hat{d}_n) \qquad \text{[Equation 9]}$$

In addition, a smooth L1 algorithm may be expressed by Equation 10 below.

$$\text{Smooth } L1 = \begin{cases} \dfrac{0.5(d_n - \hat{d}_n)^2}{\lambda}, & \text{if } |d_n - \hat{d}_n| < \lambda \\ |d_n - \hat{d}_n| - 0.5 * \lambda, & \text{otherwise} \end{cases} \qquad \text{[Equation 10]}$$

The apparatus for generating lane polyline may train the second neural network model so that at least one from the embedding offset loss, the seed probability loss, and the order loss may have a minimum value.

In an embodiment, the apparatus for generating lane polyline may train the second neural network model so that a final loss according to Equation 11 below may be minimized. In Equation 11, $\alpha$, $\beta$, $\gamma$ may be set differently according to importance of each term.

$$L_{total} = \alpha L_{embed} + \beta L_{seed} + \gamma L_{ord} \qquad \text{[Equation 11]}$$

Also, the apparatus for generating lane polyline may train the first to third neural network models so that at least one from the embedding offset loss, the seed probability loss, the order loss, a translation loss, and the height loss may be minimized.

In an embodiment, the apparatus for generating lane polyline may train the first to third neural network models so that a final loss according to Equation 12 below may be minimized. In Equation 12, $\alpha$, $\beta$, $\gamma$, $\delta$, $\varepsilon$ may be set differently according to importance of each term.

$$L_{total} = \alpha L_{embed} + \beta L_{seed} + \gamma L_{ord} + \delta L_{total} + \varepsilon L_{height} \qquad \text{[Equation 12]}$$

FIG. 10 is a flowchart for describing generation of a lane polyline by using a neural network model according to an embodiment.

Referring to FIG. 10, in operation 1010, the apparatus for generating lane polyline may obtain a base image with respect to a certain road from at least one sensor loaded in a vehicle.

In operation 1020, the apparatus for generating lane polyline may extract a multi-scale image feature by using the base image.

In operation 1030, the apparatus for generating lane polyline may input the multi-scale image feature to the first neural network model as input data and may obtain a BEV feature as output data from the first neural network model.

In an embodiment, the apparatus for generating lane polyline may train the first neural network model by using the translation loss calculated through a bi-directional comparison between pixel coordinates of a plurality of image features and grids in the BEV feature.

The translation loss may be determined based on a first value indicating a difference between a value obtained by applying a lookup table function to the pixel coordinate and the grid value, and a second value indicating a difference between the pixel coordinate value and a value obtained by applying a lookup table inverse function to the grid value. The translation loss may be expressed as Equation 2 above.

In operation 1040, the apparatus for generating lane polyline may input the BEV feature to the second neural network as input data and may obtain a polyline image with respect to a certain road as output data from the second neural network model.

In an embodiment, the apparatus for generating lane polyline may train the second neural network model by using the embedding offset loss. The offset loss may be determined based on a probability that, with respect to a plurality of clusters corresponding respectively to a plurality of lanes included in a certain road, each of background pixels corresponds to a certain cluster from among the plurality of clusters.

Also, the apparatus for generating lane polyline may train the second neural network model by using the seed probability loss. The seed probability loss may be determined by, from among a plurality of pixels included in the BEV feature, applying a first equation to a pixel included in the foreground and applying a second equation to a pixel included in the background.

Also, the apparatus for generating lane polyline may train the second neural network model by using the order loss. The order loss may be determined by using an order of foreground pixels for lanes corresponding to the cluster, in which each of the foreground pixels is included, from among the plurality of pixels included in the BEV feature.

In an embodiment, the apparatus for generating lane polyline may train the neural network model so that at least one from the embedding offset loss, the seed probability loss, and the order loss may have a minimum value.

In an embodiment, the apparatus for generating lane polyline may input the BEV feature into the third neural network model as input data and may obtain a height value for each grid in the BEV feature as output data from the third neural network model.

The height loss of the third neural network model may be determined based on a height value of a pseudo ground truth map obtained by interpolating a z-value in the grid of the BEV feature by using a lane marker.

In an embodiment, the apparatus for generating lane polyline may generate a control signal for controlling a vehicle driving on a certain road, based on a polyline image with respect to the certain road. For example, the apparatus for generating lane polyline may determine a lane-keeping status, a lane changing status, a lane departure status, etc. of the vehicle by using the polyline image, and may generate the control signal based on the determined status.

Figure 11:
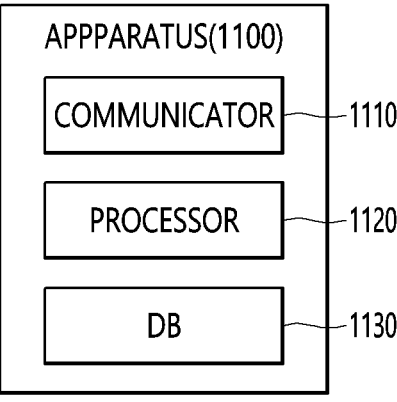
FIG. 11 is a block diagram of an apparatus for generating a lane polyline according to an embodiment.

FIG. 11 is a block diagram of an apparatus for generating lane polyline 1100 according to an embodiment.

Referring to FIG. 11, the apparatus for generating lane polyline 1100 may include a communicator 1110, a processor 1120, and a database (DB) 1130. In the apparatus for generating lane polyline 1100 of FIG. 11, components related to the embodiment are only shown. Therefore, it will be understood by one of ordinary skill in the art that general-purpose components other than the components shown in FIG. 11 may be further included.

The communicator 1110 may include one or more components allowing wired/wireless communication with an external server or an external device. For example, the communicator 1110 may include at least one from a short-range wireless communicator (not shown), a mobile communicator (not shown), and a broadcast receiver (not shown).

The DB 1130 is hardware for storing various data processed in the apparatus for generating lane polyline 1100 and may store programs for processing and controlling in the processor 1120.

The DB 1130 may include a random-access memory (RAM) such as dynamic random access memory (DRAM), static RAM (SRAM), etc., a read-only memory (ROM), an electrically erasable programmable read-only memory (EE-PROM), CD-ROM, Blu-ray or another optical disc storage, hard disk drive (HDD), solid state drive (SSD), or flash memory.

The processor 1120 controls overall operations of the apparatus for generating lane polyline 1100. For example, the processor 1120 may be configured to generally control an input unit (not shown), a display (not shown), the communicator 1110, the DB 1130, etc. by executing programs stored in the DB 1130. The processor 1120 may control the operation of the apparatus for generating lane polyline 1100 by executing the programs stored in the DB 1130.

The processor 1120 may control at least some of the operations of the apparatus for generating lane polyline 1100 described above with reference to FIGS. 1 to 10. The apparatus for generating lane polyline 1100 and the autonomous driving device 40 may be the same device, or at least some of operations performed in each device may be the same.

The processor 1120 may be implemented by at least one of application specific integrated circuits (ASICs), digital signal processors (DSPs), digital signal processing devices (DSPDs), programmable logic devices (PLDs), field programmable gate arrays (FPGAs), controllers, microcontrollers, microprocessors, and electric units for performing other functions, as hardware.

In an embodiment, the apparatus for generating lane polyline 1100 may include an electronic device having mobility. For example, the apparatus for generating lane polyline 1100 may be implemented in a smartphone, tablet PC, PC, smart TV, personal digital assistant (PDA), laptop, media player, navigation device, camera-equipped device, and other mobile electronic devices. Also, the apparatus for generating lane polyline 1100 may be implemented in a wearable device such as a watch, glasses, a hair-band, a ring, etc. having a communication function and a data processing function.

In another embodiment, the apparatus for generating lane polyline 1100 may include an electronic device embedded in a vehicle. For example, the apparatus for generating lane polyline 1100 may include an electronic device inserted into a vehicle through tuning after producing processes.

In another embodiment, the apparatus for generating lane polyline 1100 may include a server located outside a vehicle. A server may be implemented as a computer device or a plurality of computer devices providing commands, codes, files, content, service, etc. by communicating through a network. The server may receive data that is necessary for generating a lane polyline from devices loaded in a vehicle and may determine a movement passage of the vehicle based on the received data.

In another embodiment, the processes performed in the apparatus for generating lane polyline 1100 may be performed by at least some of an electronic device having mobility, an electronic device embedded in the vehicle, and a server located outside the vehicle.

One or more of the above embodiments may be embodied in the form of a computer program that may be run in and/or executed by a computer through various elements, and the computer program may be recorded on a non-transitory computer-readable recording medium. Examples of the non-transitory computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories).

Meanwhile, the computer programs may be specially designed or well known to one of ordinary skill in the computer software field. Examples of the computer programs may include not only machine language code but also high-level language code which is executable by various computing means by using an interpreter.

According to an embodiment, the method according to various embodiments disclosed in the present disclosure may be provided to be included in a computer program product. The computer program product may be traded between a seller and a buyer as a product. The computer program product may be distributed in the form of a machine-readable storage medium e.g., compact disc read only memory (CD-ROM)), or be distributed (e.g., downloaded or uploaded) online via an application store (e.g., PlayStore™), or between two user devices directly. If distributed online, at least part of the computer program product may be temporarily generated or at least temporarily stored in the machine-readable storage medium, such as memory of the manufacturer's server, a server of the application store, or a relay server.

Also, the steps of all methods described herein may be performed in any suitable order unless otherwise indicated herein or otherwise clearly contradicted by context. The present disclosure is not limited to the described order of the steps. The use of any and all examples, or example language (e.g., "such as") provided herein, is intended merely to better illuminate the present disclosure and does not pose a limitation on the scope of the present disclosure unless otherwise claimed. Also, those of ordinary skill in the art will readily appreciate that many alternations, combinations and modifications, may be made according to design conditions and factors within the scope of the appended claims and their equivalents.

Therefore, the spirit of the present disclosure shall not be limited to the above-described embodiments, and the entire scope of the appended claims and their equivalents will fall within the scope and spirit of the disclosure.

According to the above technical solution, a lane polyline for a certain road may be obtained with high accuracy from bird eye view (BEV) features through end-to-end learning of a neural network.

Also, in the present disclosure, a lens polyline obtained from the neural network may be utilized in vehicle control without going through an additional treatment process.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of generating a polyline image by using a neural network model, the method comprising:
obtaining a base image of a certain road from at least one sensor loaded in a vehicle;
extracting a multi-scale image feature by using the base image;
inputting the multi-scale image feature into a first neural network model as input data and obtaining a bird eye view (BEV) feature as output data from the first neural network model; and
inputting the BEV feature into a second neural network model as input data and obtaining a polyline image of the certain road as output data from the second neural network model,
wherein the first neural network model is trained by using a translation loss which maintains consistency regardless of view change and calculated through a bidirectional comparison between pixel coordinates of the plurality of multi-scale image features and grids in the BEV feature,
wherein the translation loss is determined based on a first value indicating a difference between a value obtained by applying a lookup table function to the pixel coordinate and a grid value and a second value indicating a difference between the pixel coordinate value and a value obtained by applying a lookup table inverse function to the grid value, and
wherein the first neural network model is detached from the second neural network model in order for a backpropagation of a gradient calculated by the translation loss not to affect the second neural network model.

2. The method of claim 1, further comprising inputting the BEV feature into a third neural network model as input data and obtaining a height value for each grid in the BEV feature as output data from the third neural network model.

3. The method of claim 2, wherein a height loss of the third neural network model is determined based on a height value of a pseudo ground truth map that is obtained by interpolating a z-value in the grid of the BEV feature by using a lane marker.

4. The method of claim 1, wherein the second neural network model is trained by using an embedding offset loss, and
the offset loss is determined based on a probability that, with respect to a plurality of clusters respectively corresponding to a plurality of lanes included in the certain road, each of foreground pixels corresponds to a certain cluster from among the plurality of clusters.

5. The method of claim 1, wherein
the second neural network model is trained by using a seed probability loss, and
the seed probability loss is determined by applying a first equation to a pixel included in a foreground and applying a second equation to a pixel included in a background, from among a plurality of pixels included in the BEV feature.

6. The method of claim 1, wherein
the second neural network model is trained by using an order loss, and
the order loss is determined by using an order of foreground pixels for lanes corresponding to a cluster, in which each of the foreground pixels is included, from among a plurality of pixels included in the BEV feature.

7. The method of claim 1, further comprising generating a control signal for controlling a vehicle driving on the certain road based on the polyline image of the certain road.

8. A neural network apparatus for generating a polyline image, the neural network apparatus comprising:
a memory in which at least one program is stored; and
a processor driving a neural network by executing the at least one program,
wherein the processor is configured to
obtain a base image of a certain road from at least one sensor loaded in a vehicle,
extract a multi-scale image feature by using the base image,
input the multi-scale image feature into a first neural network model as input data and obtain a bird eye view (BEV) feature as output data from the first neural network model, and
input the BEV feature into a second neural network model as input data and obtain a polyline image of the certain road as output data from the second neural network model,
wherein the first neural network model is trained by using a translation loss which maintains consistency regardless of view change and calculated through a bidirectional comparison between pixel coordinates of the plurality of multi-scale image features and grids in the BEV feature,
wherein the translation loss is determined based on a first value indicating a difference between a value obtained by applying a lookup table function to the pixel coordinate and a grid value and a second value indicating a difference between the pixel coordinate value and a value obtained by applying a lookup table inverse function to the grid value, and
wherein the first neural network model is detached from the second neural network model in order for a backpropagation of a gradient calculated by the translation loss not to affect the second neural network model.

9. A computer-readable recording medium having recorded thereon a program for performing the method of claim 1 on a computer.

\* \* \* \* \*